United States Patent
André et al.

(10) Patent No.: US 10,450,644 B2
(45) Date of Patent: Oct. 22, 2019

(54) STEEL ALLOY AND A COMPONENT COMPRISING SUCH A STEEL ALLOY

(71) Applicants: Erasteel, Paris (FR); Aubert & Duval, Paris (FR)

(72) Inventors: Johanna André, Uppsala (SE); Fredrik Sandberg, Uppsala (SE); M. Atman Benbahmed, Saint-Denis (FR); Jacques Bellus, Saint Genest-Lerpt (FR)

(73) Assignees: ERASTEEL, Paris (FR); AUBERT & DUVAL, Paris (FR)

( * ) Notice: Subject to any disclaimer, the term of this patent is extended or adjusted under 35 U.S.C. 154(b) by 444 days.

(21) Appl. No.: 15/100,665

(22) PCT Filed: Nov. 28, 2014

(86) PCT No.: PCT/EP2014/075938
§ 371 (c)(1),
(2) Date: Jun. 1, 2016

(87) PCT Pub. No.: WO2015/082342
PCT Pub. Date: Jun. 11, 2015

(65) Prior Publication Data
US 2016/0298225 A1    Oct. 13, 2016

(30) Foreign Application Priority Data
Dec. 2, 2013 (SE) ...................... 1351430

(51) Int. Cl.
| | |
|---|---|
| C23C 8/22 | (2006.01) |
| C23C 8/26 | (2006.01) |
| C23C 8/32 | (2006.01) |
| C23C 8/80 | (2006.01) |
| C21D 1/06 | (2006.01) |
| C22C 38/02 | (2006.01) |
| C22C 38/04 | (2006.01) |
| C22C 38/44 | (2006.01) |
| C22C 38/46 | (2006.01) |
| C22C 38/52 | (2006.01) |
| F16C 33/62 | (2006.01) |
| C21D 9/40 | (2006.01) |
| C22C 33/02 | (2006.01) |
| B22F 3/15 | (2006.01) |
| B22F 5/00 | (2006.01) |
| C21D 1/18 | (2006.01) |
| C21D 9/36 | (2006.01) |
| C22C 33/04 | (2006.01) |
| B22F 5/10 | (2006.01) |

(52) U.S. Cl.
CPC .............. *C23C 8/26* (2013.01); *B22F 3/15* (2013.01); *B22F 5/00* (2013.01); *C21D 1/06* (2013.01); *C21D 1/18* (2013.01); *C21D 9/36* (2013.01); *C21D 9/40* (2013.01); *C22C 33/02* (2013.01); *C22C 33/0278* (2013.01); *C22C 33/04* (2013.01); *C22C 38/02* (2013.01); *C22C 38/04* (2013.01); *C22C 38/44* (2013.01); *C22C 38/46* (2013.01); *C22C 38/52* (2013.01); *C23C 8/22* (2013.01); *C23C 8/32* (2013.01); *C23C 8/80* (2013.01); *F16C 33/62* (2013.01); *B22F 5/106* (2013.01); *B22F 2998/10* (2013.01); *C21D 2211/004* (2013.01); *C21D 2211/005* (2013.01); *C21D 2211/008* (2013.01); *C21D 2241/02* (2013.01); *F16C 2204/66* (2013.01)

(58) Field of Classification Search
CPC .. C21D 1/18; C21D 9/36; C22C 38/52; C22C 38/46; C22C 38/44; C22C 38/04; C22C 38/22; C22C 33/02; C23C 8/22
See application file for complete search history.

(56) References Cited

U.S. PATENT DOCUMENTS

| | | | | |
|---|---|---|---|---|
| 4,729,872 A | * | 3/1988 | Kishida | C22C 38/22 420/105 |
| 2004/0187972 A1 | * | 9/2004 | Ozaki | C22C 38/02 148/333 |
| 2010/0154937 A1 | * | 6/2010 | Ohki | C21D 1/06 148/215 |

FOREIGN PATENT DOCUMENTS

| | | |
|---|---|---|
| EP | 739 994 A1 | 10/1996 |
| GB | 2 370 281 A | 6/2002 |
| JP | H10-219402 A | 8/1998 |
| JP | H11-131193 A | 5/1999 |
| JP | 2000-248332 A | 9/2000 |

* cited by examiner

*Primary Examiner* — Jessee R Roe
(74) *Attorney, Agent, or Firm* — Dilworth & Barrese, LLP.

(57) ABSTRACT

A carburisable steel alloy suitable for bearing components comprising, in percent by weight: C 0.05-0.5 wt. % Cr 2.5-5.0 wt. %, Mo 4-6 wt. %, W 2-4.5 wt. %, V 1-3 wt. %, Ni 2-4 wt. %, Co 2-8 wt. %, optionally one or more of the following elements: Nb 0-2 wt. % N 0-0.5 wt. % Si 0-0.7 wt. %, Mn 0-0.7 wt. %, Al 0-0.1 5 wt. %, wherein the combined amount of Nb+V is within the range 1-3.5 wt. %, the combined amount of C+N is within the range 0.05-0.5 wt. %, the balance being Fe and unavoidable impurities.

19 Claims, 5 Drawing Sheets

STEEL ALLOY AND A COMPONENT COMPRISING SUCH A STEEL ALLOY

TECHNICAL FIELD OF THE INVENTION AND PRIOR ART

The present invention relates to a carburisable steel alloy and a mechanical component comprising said steel alloy.

Bearings are devices configured to permit constrained relative motion between two parts. Rolling bearings are bearings comprising inner and outer rings comprising raceways, and a plurality of rolling elements (balls or rollers) arranged between the rings. Normally the components of the bearings are manufactured from steel alloys resulting in components with high fracture toughness and resistance to rolling contact fatigue and wear. Rolling bearings are for example used in aerospace applications, such as in aircraft engines, where bearings with exceptional durability are required in order to ensure a consistent performance despite changes in temperature and air pressure.

Recent developments in the aerospace industry aim at lowering $CO_2$ and $NO_x$ emissions, which however leads to a larger amount of bearings per engine, alternatively the size of the bearings increases. In order to keep the weight and the size of the engine down while increasing its efficiency, it is necessary to also keep the weight and the size of the bearings down, without compromising their mechanical properties. Recent research efforts aim at achieving this by exchanging the steel rolling elements for ceramic rolling elements with lower density and high hardness compared to steel components. Thanks to the high hardness, the rolling elements can be made smaller. However, also the size of the rings needs to be reduced. The rings need to exhibit on one hand a very hard outer surface providing wear resistance and low friction, and on the other hand a core with high fracture toughness and strength in order to withstand crack propagation and deformation. With conventional bearing alloys, it is not possible to reach this combination of properties. One example of such a conventional bearing alloy is 50NiL, comprising 0.13 wt. % C, 0.25 wt. % Mn, 0.20 wt. % Si, 4.2 wt. % Cr, 3.4 wt. % Ni, 1.2 wt. % V, 4.25 wt. % Mo, and balance Fe and impurities.

Another steel alloy composition suitable for bearings is disclosed in U.S. Pat. No. 5,424,028. This is a corrosion resistant alloy comprising Cr in amounts of 13-19 wt. %. However, the large amount of alloying elements renders the alloy expensive and it is therefore desirable to find a less expensive alternative.

SUMMARY OF THE INVENTION

It is an object of the present invention to provide a steel alloy which, when carburised and heat treated, can be used in demanding applications such as in hybrid rolling bearings and which has, in at least some aspect, improved properties with respect to conventional steel alloys used for rolling bearings. Another object is to provide a mechanical component with properties suitable for demanding applications, such as aerospace applications.

The first object is achieved by a carburisable steel alloy according to claim 1. The alloy comprises, in percent by weight:

| | |
|---|---|
| C | 0.05-0.5 wt. %, |
| Cr | 2.5-5.0 wt. %, |
| Mo | 4-6 wt. %, |
| W | 2-4.5 wt. %, |
| V | 1-3 wt. %, |
| Ni | 2-4 wt. %, |
| Co | 2-8 wt. %, | optionally one or more of the following elements:

| | |
|---|---|
| Nb | 0-2 wt. %, |
| N | 0-0.5 wt. %, |
| Si | 0-0.7 wt. %, |
| Mn | 0-0.7 wt. %, |
| Al | 0-0.15 wt. %, | wherein the combined amount of Nb+V is within the range 1-3.5 wt. %,
wherein the combined amount of C+N is within the range 0.05-0.5 wt. %,
the balance being Fe and unavoidable impurities.

Carbide forming elements, which also have ferrite stabilising effects, are essential for the steel alloy according to the invention in order to provide the alloy with sufficient hardness, heat resistance and wear resistance. Therefore, the austenite stabilising elements are crucial for balancing this alloy. A correct combination of the austenite stabilising elements (carbon, nickel, cobalt and manganese) and the ferrite stabilising elements (molybdenum, tungsten, chromium, vanadium and silicon) results in superior properties in the carburisable steel alloy according to the invention.

With the steel alloy according to the invention, it is possible to combine a very hard and wear resistant surface with a core with high strength and fracture toughness. Thus, the steel alloy is very suitable for demanding applications such as for bearing components of reduced size for the aerospace industry.

According to a preferred embodiment of the invention, the steel alloy comprises less than 1 wt. % unavoidable impurities, preferably less than 0.5 wt. %. Preferably, unavoidable impurities are kept to a minimum. In this way, impurities will have a minimum impact on the final properties of the steel alloy.

According to one embodiment, the combined amount of C+N is within the range 0.05-0.3 wt. %.

According to one embodiment, the steel alloy comprises 0.1-0.3 wt. % C. Keeping the carbon content within this range ensures that an optimum amount of carbides can be formed in the non-carburised steel alloy core upon hardening and tempering. It also minimises the risk of forming brittle intermetallic phases within the alloy.

According to one embodiment, the steel alloy comprises 3-4.5 wt. % Cr. Within this range, the maximum hardening temperature of the alloy is optimised so that hardening can be performed at high enough temperature, thus improving the hardness of the material after hardening. Preferably, the steel alloy comprises 3-4 wt. % Cr.

According to one embodiment, the steel alloy comprises 3-7 wt. % Co. This range ensures a balance of toughness and hardness of the material. Preferably, the steel alloy comprises 4-6 wt. % Co.

According to one embodiment, the steel alloy comprises 1.5-2.5 wt. % V. Within this range, the hardness and the wear resistance of the steel alloy after hardening is optimised.

According to one embodiment, the expression 11 wt. % $\leq W_{eq} \leq 15$ wt. % is satisfied, wherein $W_{eq}=W+2*Mo$. Both W and Mo form mainly $M_6C$ carbides which are easily dissolved during hardening and contribute to hardening of the matrix. Keeping the combined amount within this range gives a sufficient amount of carbides in the surface layer of the steel alloy upon carburising.

According to one embodiment, the steel alloy after hardening and tempering has a microstructure comprising tempered martensite and precipitated carbides, which microstructure is free or essentially free from ferrite. This gives a core with high strength.

According to one embodiment, the steel alloy is produced by vacuum induced melting and vacuum induced remelting (VIM-VAR). The steel alloy produced using VIM-VAR has a high purity and a low level of inclusions.

According to another embodiment, the steel alloy is in the form of a powder metallurgy steel alloy produced by gas atomisation. Using gas atomisation, it is possible to obtain a powder metallurgy steel alloy with high purity, low level of inclusions and very fine dispersed carbides. Gas atomised powder is spherical and may be densified into a homogeneous material using for example hot isostatic pressing (HIP).

According to another aspect of the invention, the second object is achieved by a mechanical component comprising a steel alloy according to any of the preceding claims.

According to a preferred embodiment, the mechanical component has a surface layer with an increased hardness as a result of carburising or nitriding or a combination thereof. Preferably, the mechanical component has an increased carbon content in its surface layer as a result of carburising. This results in a very hard surface layer after hardening, since carbides introduced during carburising are dissolved in the matrix during subsequent hardening, thus increasing the hardness of the surface only. The core remains softer than the surface layer, which reduces the risk of crack propagation from the surface and to the core of the component.

According to one embodiment, the carbon content in the surface layer is at least 1.0 wt. %, preferably at least 1.1 wt. %. The component according to this embodiment has a surface layer with very high hardness. Preferably, the carbon content in the surface layer should not exceed 1.7 wt. %. This reduces the risk of local melting during heat treatment and cementite forming, which result in brittleness of the surface layer.

According to one embodiment, the mechanical component is formed from hot isostatically-pressed powder metallurgy steel alloy. Such a component is free from porosity and has a low level of impurities and inclusions.

According to one embodiment, the mechanical component is a bearing component. Such as bearing component can be made smaller than a bearing component formed from standard bearing steel alloys such as 50NiL, and thus saves weight and space. The bearing component is particularly suitable for hybrid bearings and for use in bearing applications with long lifetimes and which have to withstand high loads. Preferably, the bearing component is an inner ring or an outer ring of a rolling bearing.

Further advantages and advantageous features of the invention will appear from the following description of the invention and embodiments thereof.

BRIEF DESCRIPTION OF THE DRAWINGS

The present invention will now be described in detail with reference to the attached drawings, wherein.

DETAILED DESCRIPTION OF EMBODIMENTS OF THE INVENTION

Figure 1A:
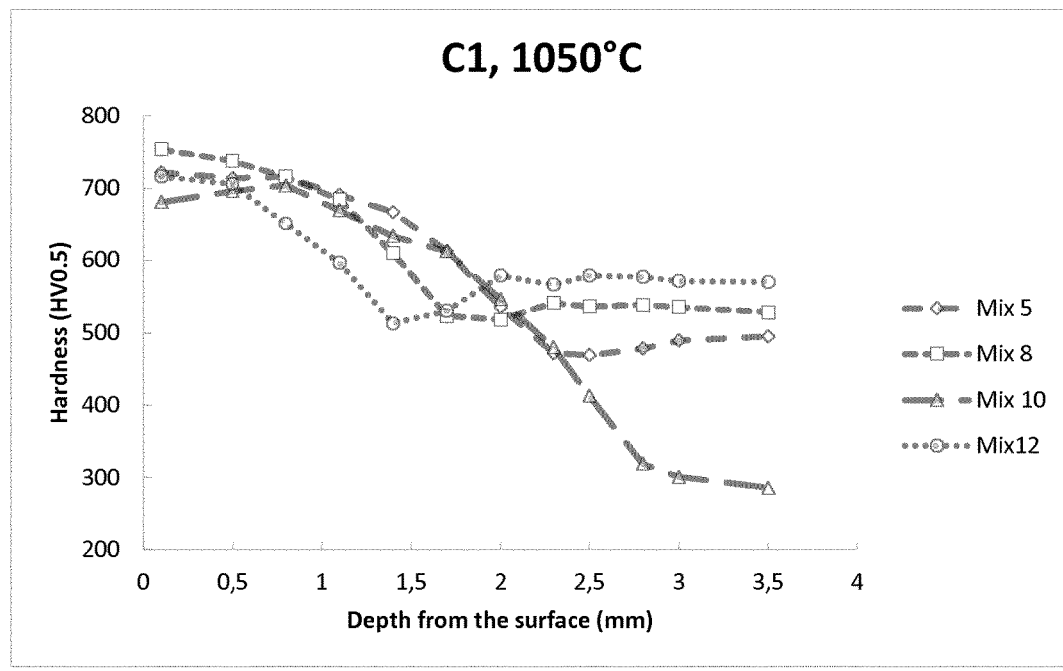
FIG. 1a shows hardness profiles obtained for samples which were carburised at 980° C. and thereafter austenitised at 1050° C.
Figure 1B:
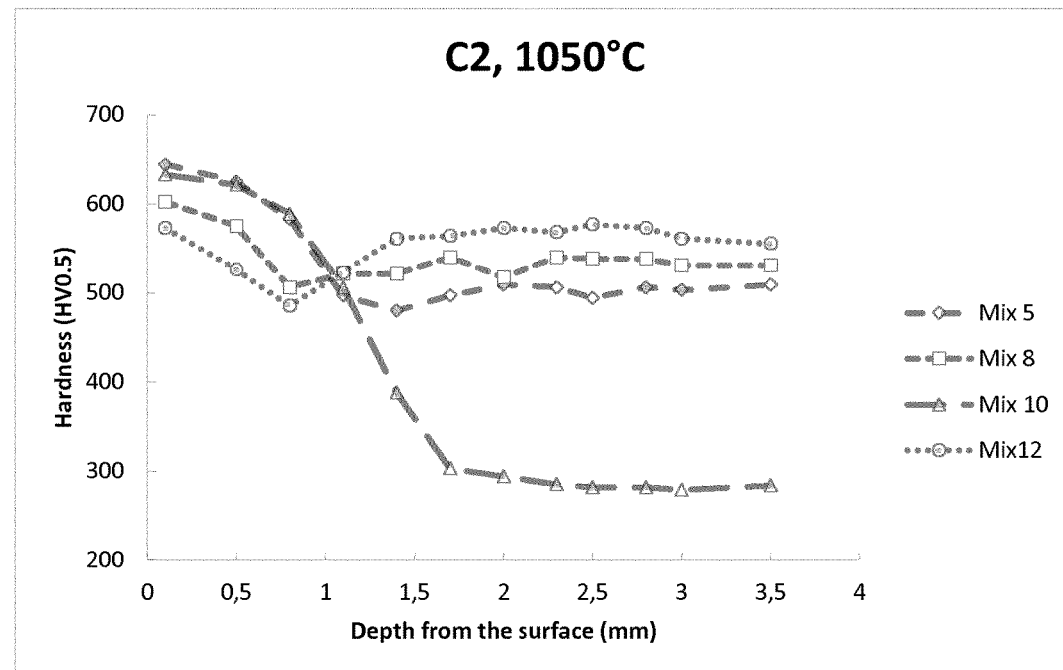
FIG. 1b shows hardness profiles obtained for samples which were carburised at 955° C. and thereafter austenitised at 1050° C.

The carburisable steel alloy according to the invention, particularly suitable for bearing components, comprises in percent by weight:

| | |
|---|---|
| C | 0.05-0.5 wt. %, |
| Cr | 2.5-5.0 wt. %, |
| Mo | 4-6 wt. %, |
| W | 2-4.5 wt. %, |
| V | 1-3 wt. %, |
| Ni | 2-4 wt. %, |
| Co | 2-8 wt. %, | optionally one or more of the following elements:

| | |
|---|---|
| Nb | 0-2 wt. %, |
| N | 0-0.5 wt. %, |
| Si | 0-0.7 wt. %, |
| Mn | 0-0.7 wt. %, |
| Al | 0-0.15 wt. %, | wherein the combined amount of Nb+V is within the range 1-3.5 wt. %, the combined amount of C+N is within the range 0.05-0.5 wt. %, and the balance is Fe and unavoidable impurities.

Carbon (C) stabilises the austenitic phase of the steel alloy at heat treating temperatures and is essential for formation of carbides that provides strength, high hardness, heat resistance and wear resistance. A small amount of carbon in the steel alloy is beneficial in order to avoid formation of undesirable and brittle intermetallic particles and to form small amounts of carbides to avoid excessive grain growth during hardening. The initial carbon content should however not be too high, since it should be possible to increase the surface hardness of components formed from the steel alloy using carburising. During carburising, carbon is implanted into the surface layers of the component so that a hardness gradient is achieved. Carbon is the main element to control the hardness of the martensite formed after carburising and heat treatment. In a carburising alloy, it is essential to have a tough core with low carbon content, whereas it is desired to attain a hard surface with high carbon content after heat treatment through carburising. Carbon is therefore limited to an amount of 0.05-0.5 wt. %, preferably 0.1-0.3 wt. %.

Nitrogen (N) promotes the formation of austenite and depresses the transformation of austenite into martensite. Nitrogen can to some extent replace carbon in the steel alloy and is optionally present in an amount of 0-0.5 wt. %, preferably 0-0.2 wt. %.

Chromium (Cr) contributes to the formation of carbides in the steel alloy and is, after carbon, the main element that controls the hardenability of the steel alloy. However, chromium may also promote ferrite and retained austenite. Moreover, increasing the amount of Cr reduces the maximum hardening temperature. Cr must therefore be controlled to an amount of 2.5-5.0 wt. %, preferably 3-4.5 wt. %, and more preferably 3-4 wt. % Cr.

Molybdenum (Mo) improves the tempering resistance, wear resistance and hardness of the steel alloy. However, molybdenum has a strong stabilising effect on the ferrite phase. Molybdenum is therefore limited to 4-6%.

Tungsten (W) is a ferrite stabiliser and a strong carbide forming element. Tungsten improves the heat resistance, wear resistance and hardness by the formation of carbides. Tungsten and molybdenum are in some cases exchangeable and the tungsten equivalent $W_{eq}=W+2*Mo$ can be used as a rule of thumb. $W_{eq}$ here represents the amount of W that is needed to substitute the effect of both W and Mo in the alloy. Tungsten should be limited to 2-4.5 wt. %, preferably 2-4 wt. %, while $W_{eq}$ should be within the range 11-15 wt. %.

Vanadium (V) stabilizes the ferrite phase and has a high affinity to carbon and nitrogen. Vanadium provides wear resistance and tempering resistance by the formation of hard vanadium carbides. Vanadium can in part be substituted for niobium (Nb), which has similar properties. Vanadium should be limited to 1-3 wt. %, preferably 1.5-2.5 wt. %.

Silicon (Si) acts as a strong ferrite stabiliser, but is often present in the steel manufacturing process for de-oxidation of the liquid steel. Low oxygen content is in turn important for low levels of non-metallic inclusions and good mechanical properties such as strength and fatigue resistance. Silicon is optionally present in an amount of 0-0.7 wt. %, preferably 0.05-0.5 wt. %.

Nickel (Ni) promotes the formation of austenite and thus inhibits the formation of ferrite. Another effect of nickel is to decrease the $M_s$ temperature, i.e. the temperature at which the transformation from austenite to martensite begins upon cooling. This may prevent the formation of martensite. The amount of nickel should be controlled in order to avoid retained austenite in carburised components. The amount of nickel should be 2-4 wt. %.

Cobalt (Co) is a strong austenite-stabilising element that prevents the formation of undesired ferrite. Unlike nickel, cobalt raises the $M_s$ temperature, which in turn lowers the amount of retained austenite. Cobalt together with nickel enables the presence of ferrite stabilisers such as the carbide forming elements Mo, W, Cr and V. The carbide forming elements are essential for the alloy according to the invention due to their effect on the hardness, the heat resistance and the wear resistance. Cobalt also has a slight hardness raising effect on the steel alloy. However, as the hardness increases, the fracture toughness of the alloy will decrease. Cobalt is therefore limited to 2-8 wt. %, preferably 3-7 wt. % and more preferably 4-6 wt. %.

Manganese (Mn) stabilizes the austenite phase and decreases the $M_s$ temperature in the steel alloy. Manganese is commonly added to steels in order to tie up sulphur by formation of manganese sulphides during solidification. This removes the risk of formation of iron sulphides, which have detrimental effects on the hot workability of the steel. Mn is also part of the de-oxidation process together with Si. The combination of Si and Mn gives a more efficient de-oxidation than Mn or Si alone. Mn is optionally present in an amount of 0-0.7 wt. %, preferably 0.05-0.5 wt. %.

Aluminium (Al) is optionally present in the steel manufacturing process for deoxidation of the liquid steel. This is particularly relevant for conventional melting processes such as in VIM-VAR, and Al is therefore present in higher amounts in steel alloys produced using VIM-VAR than in corresponding powder metallurgy steel alloys. Low oxygen content is important to achieve a good microcleanliness and also good mechanical properties such as strength and fatigue resistance. Aluminium is optionally present in an amount of 0-0.15 wt. %, preferably 0-0.10 wt. %.

Impurities, such as contamination elements, can be present in the alloy at an amount of maximum 1 wt. %, preferably maximum 0.75 wt. % and more preferably maximum 0.5 wt. %. Examples of impurities that may be present are titanium (Ti), sulphur (S), phosphorus (P), copper (Cu), tin (Sn), lead (Pb), etc. Oxygen (O) should be kept to a minimum. The impurities may be naturally-occurring in the raw material used to produce the steel alloy, or may result from the production process.

The steel alloy according to the invention may be produced by a powder metallurgic process, in which a metal powder of high purity is produced using atomisation, preferably gas atomisation since this results in powder with low amounts of oxygen. The powder is thereafter compressed using for example hot isostatic pressing (HIP). Typically, a capsule is formed by consolidating steel alloy powder under high pressure and temperature. The capsule is forged and rolled into a steel bar and components of final shape are thereafter produced by forging. Components can also be produced from steel alloy powder using a near net shape technique, by which steel alloy powder is canned in metal capsules and under high pressure and temperature is consolidated into components with the desired shape.

The steel alloy may instead be refined using a double melting process. In such a process, a steel alloy ingot may be produced using vacuum induced melting followed by vacuum arc remelting (VIM-VAR). The remelting process purifies the steel alloy and improves the homogeneity of the steel alloy ingot. One example of an alternative to vacuum arc remelting is electroslag remelting (ESR).

Components formed from the steel alloy according to the invention, produced either by a powder metallurgic process or by a double melting process, can be subjected to a case hardening in the form of nitriding, carburising or a combination thereof, in order to increase the surface hardness. If carburising is used, the carbon content of the surface layer increases and thereby also the hardness. The carburising process should be adapted so that the carbon content of the surface layer after carburising is within a range 1.0-1.7 wt. %, preferably at least 1.1 wt. %. After case hardening, the components are subjected to an austenitising hardening process at elevated temperature, followed by cooling and subsequent tempering.

The steel alloy according to the invention is particularly suitable for forming mechanical components in the form of bearing components. Preferably, the bearing component is an inner ring or an outer ring of a rolling bearing, for example of a hybrid rolling bearing in which a ceramic rolling element is used, but it could also be the rolling element of a rolling bearing. The steel alloy according to the invention is also suitable for other applications which require a hard surface layer combined with a high core toughness, such as for gear components, integrated bearing-gear components, injection systems, etc.

EXAMPLES

A number of steel alloy test samples, with alloying element compositions as listed in Table I, were produced and tested. The balance of the listed compositions was Fe and unavoidable impurities including S, P, As, Sb, Sn, Pb, and Cu in total amounts of less than 0.5 wt. %. The steel alloys also comprised N in amounts of approximately 300 ppm. Mix10 and Mix12 fall outside the scope of the present invention and are included as comparative examples.

TABLE I

|       | C     | Cr   | Mo   | W    | V    | Si   | Ni   | Co   | Mn   |
|-------|-------|------|------|------|------|------|------|------|------|
| Mix2  | 0.137 | 2.99 | 4.94 | 2.81 | 2.06 | 0.18 | 2.08 | 5.0  | 0.26 |
| Mix5  | 0.18  | 3.45 | 4.93 | 3.05 | 2.09 | 0.30 | 2.89 | 5.14 | 0.27 |
| Mix8  | 0.20  | 3.60 | 5.91 | 4.19 | 2.90 | 0.35 | 3.29 | 6.53 | 0.47 |
| Mix10 | 0.16  | 2.51 | 5.05 | 3.58 | 1.94 | 0.39 | 2.28 | 0.56 | 0.34 |
| Mix12 | 0.17  | 3.31 | 10.4 | 6.53 | 2.06 | 0.46 | 6.05 | 0.53 | 0.28 |

The listed steel alloy samples were produced by powder metallurgy. First, steel alloy powders were produced using gas atomisation, and thereafter capsules were formed from the powders by means of hot isostatic pressing (HIP). The samples were divided into groups and carburised and/or heat treated as summarised in Table II. The samples which were both carburised and heat treated were carburised before heat treatment.

TABLE II

| Steel alloy | Sample | Heat treatment | Carburising cycle | Core hardness (HV10) | Ferrite in core (vol. %) |
|---|---|---|---|---|---|
| Mix2 | Mix2-1a | HT1 | — | 375 | |
|  | Mix2-1b | HT1b | C1 | | |
|  | Mix2-3a | HT3a | — | 440 | |
| Mix5 | Mix5-1a | HT1 | — | 480 | |
|  | Mix5-1b | HT1 | C1 | | |
|  | Mix5-1c | HT1 | C2 | | |
|  | Mix5-2 | HT2 | — | 515 | 0 |
|  | Mix5-3a | HT3 | — | 545 | |
|  | Mix5-3b | HT3 | C1 | | |
|  | Mix5-3c | HT3 | C2 | | |
| Mix8 | Mix8-1a | HT1 | — | 510 | |
|  | Mix8-1b | HT1 | C1 | | |
|  | Mix8-1c | HT1 | C2 | | |
|  | Mix8-2 | HT2 | — | 525 | 9.5 ± 1.5 |
|  | Mix8-3a | HT3 | — | 530 | |
|  | Mix8-3b | HT3 | C1 | | |
|  | Mix8-3c | HT3 | C2 | | |
| Mix10 | Mix10-1a | HT1 | — | 270 | |
|  | Mix10-1b | HT1 | C1 | | |
|  | Mix10-1c | HT1 | C2 | | |
|  | Mix10-2 | HT2 | — | 300 | 38.5 ± 2.3 |
|  | Mix10-3a | HT3 | — | 320 | |
|  | Mix10-3b | HT3 | C1 | | |
|  | Mix10-3c | HT3 | C2 | | |
| Mix12 | Mix12-1a | HT1 | — | 545 | |
|  | Mix12-1b | HT1 | C1 | | |
|  | Mix12-1c | HT1 | C2 | | |
|  | Mix12-2 | HT2 | — | 565 | 12.5 ± 4.6 |
|  | Mix12-3a | HT3 | — | 530 | |
|  | Mix12-3b | HT3 | C1 | | |
|  | Mix12-3c | HT3 | C2 | | |

Heat treatment 1 (HT1) comprised the following steps:
a) Hardening at 1050° C. with 90 min holding time at temperature,
b) Deep freezing to −75° C. (±5° C.) for 2 h,
c) Tempering 3 times at 560° C. for 1 h each time and cooling to room temperature in between.

Heat treatment 1 b (HT1 b) comprised the following steps:
a) Hardening at 1040° C. with 1 h 40 min holding time at temperature,
b) Deep freezing to −75° C. (±5° C.) for 2 h,
c) Tempering 2 times at 230° C. for 5 h each time and cooling to room temperature in between,
d) Tempering 2 times at 560° C. for 2 h each time and cooling to room temperature in between.

Heat treatment 2 (HT2) comprised the following steps:
a) Hardening at 1100° C. with ~6 minutes holding time at temperature,
b) Tempering 3 times at 560° C. for 1 h each time and cooling to room temperature in between.

Heat treatment 3 (HT3) comprised the following steps:
a) Hardening at 1150° C. with 30 min holding time at temperature,
b) Deep freeze to −75° C. (±5° C.) for 2 h,
c) Tempering 3 times at 560° C. for 1 h each time and cooling to room temperature in between.

Heat treatment 3a (HT3a) comprised the following steps:
a) Hardening at 1180° C. with ~6 minutes holding time at temperature,
b) Deep freeze to −75° C. (±5° C.) for 2 h,
c) Tempering 3 times at 560° C. for 1 h each time and cooling to room temperature in between.

Carburising cycle 1 (C1) was carried out at 980° C. and carburising cycle 2 (C2) was carried out at 955° C.

The core hardness of the heat treated non-carburised samples, presented in Table II, was determined using Vicker's hardness test with a 10 kg load, i.e. a force of 98.1 N. The results of the tests are shown in Table 2. As can be seen, the samples based on Mix10 and Mix2 have a lower core hardness for corresponding hardening temperatures than samples based on Mix5, Mix8 and Mix12. This can probably be attributed to the presence of ferrite in the core as further discussed below. It can also be concluded that hardening at 1150° C. increases the hardness relative to hardening at 1050° C.

Figure 2A:
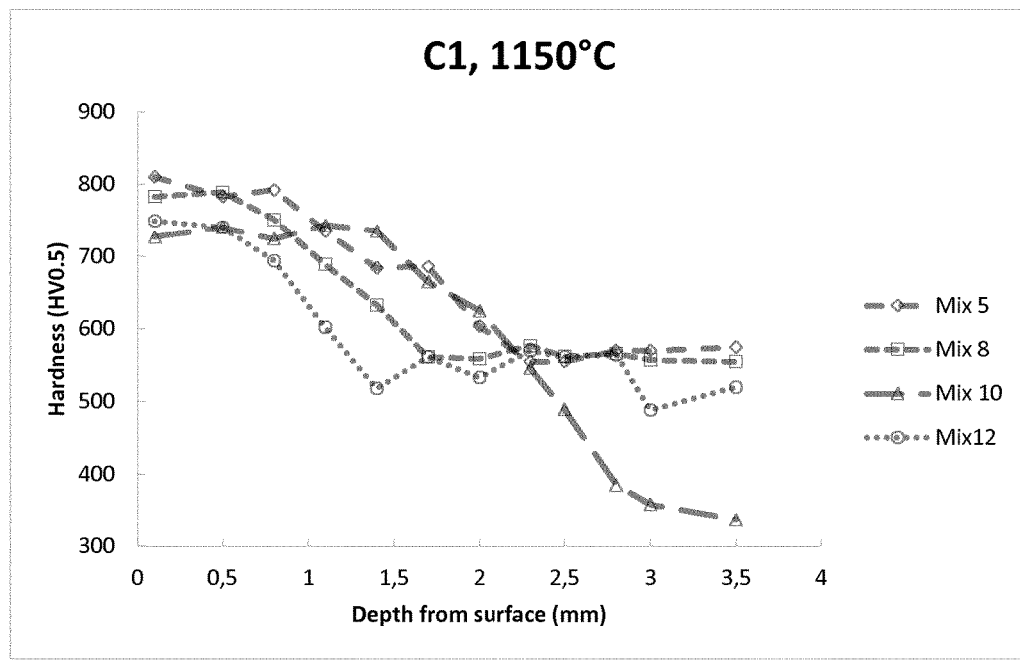
FIG. 2a shows hardness profiles obtained for samples which were carburised at 980° C. and thereafter austenitised at 1150° C.
Figure 2B:
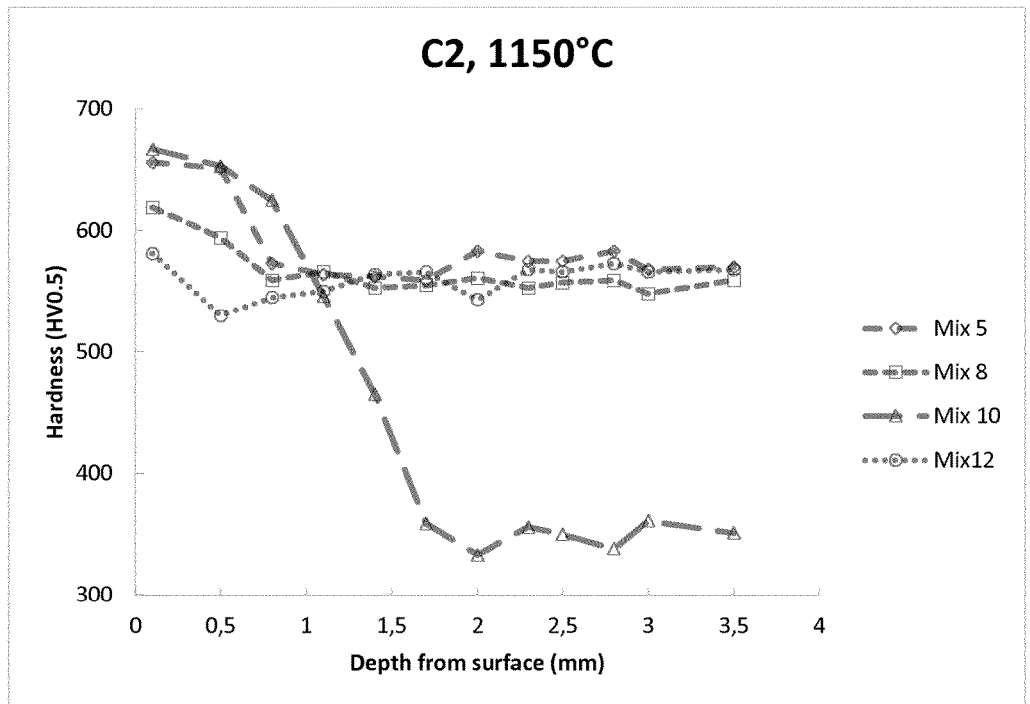
FIG. 2b shows hardness profiles obtained for samples which were carburised at 955° C. and thereafter austenitised at 1150° C.
Figure 3A:
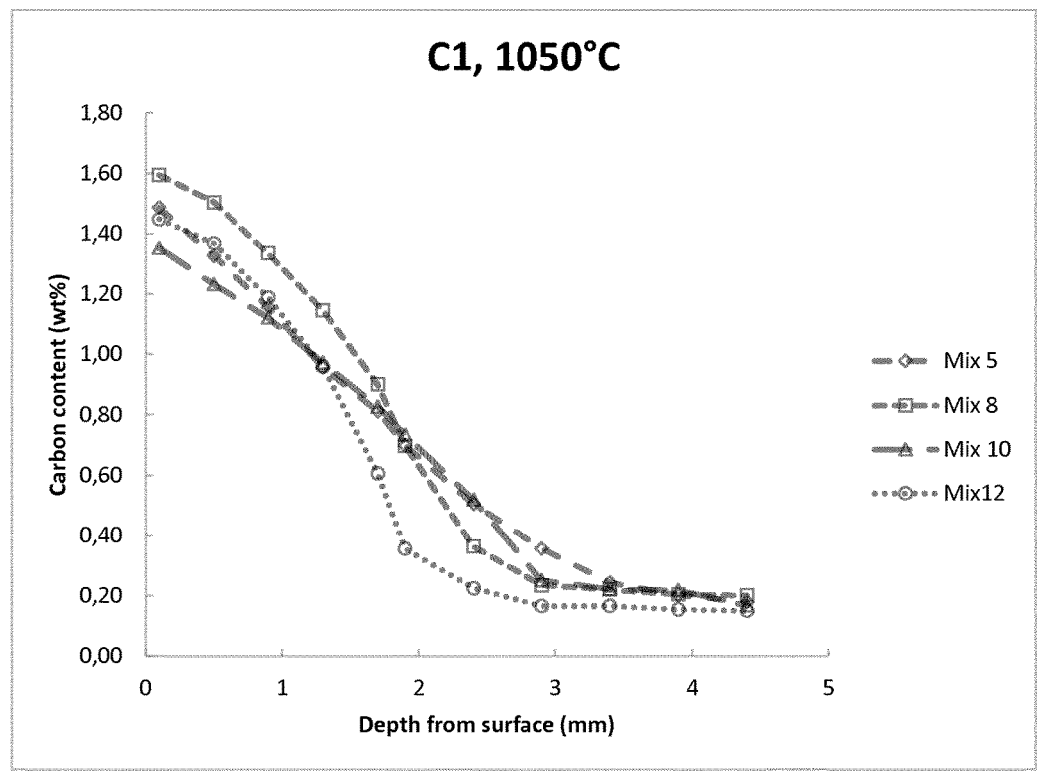
FIG. 3a shows carbon content as a function of distance from the surface for samples which were carburised at 980° C. and thereafter austenitised at 1050° C.
Figure 3B:
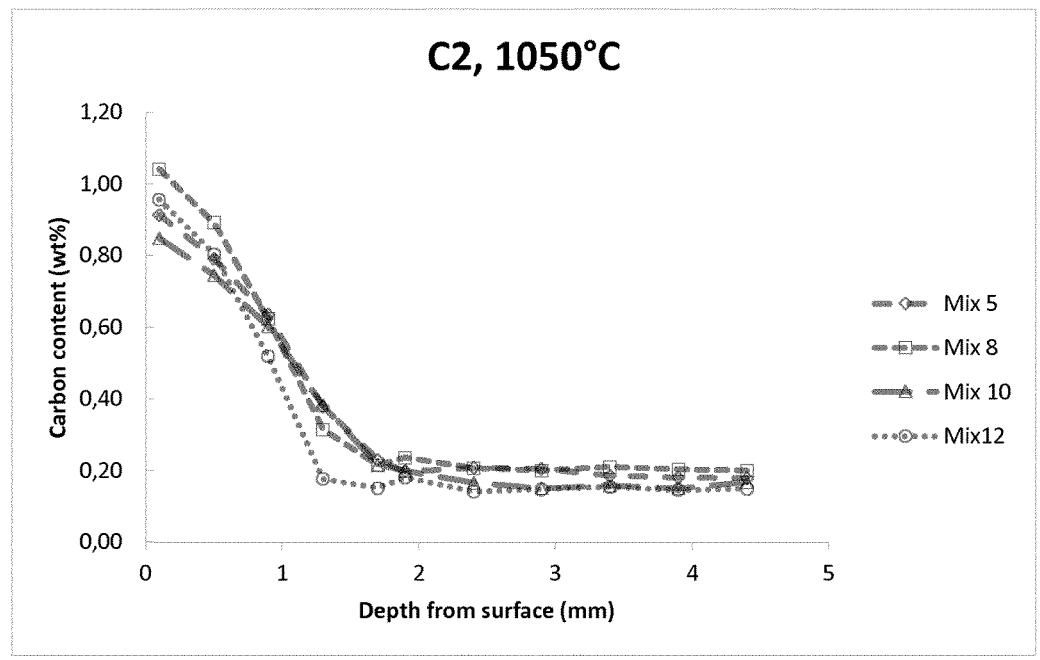
FIG. 3b shows carbon content as a function of distance from the surface for samples which were carburised at 955° C. and thereafter austenitised at 1050° C.
Figure 4A:
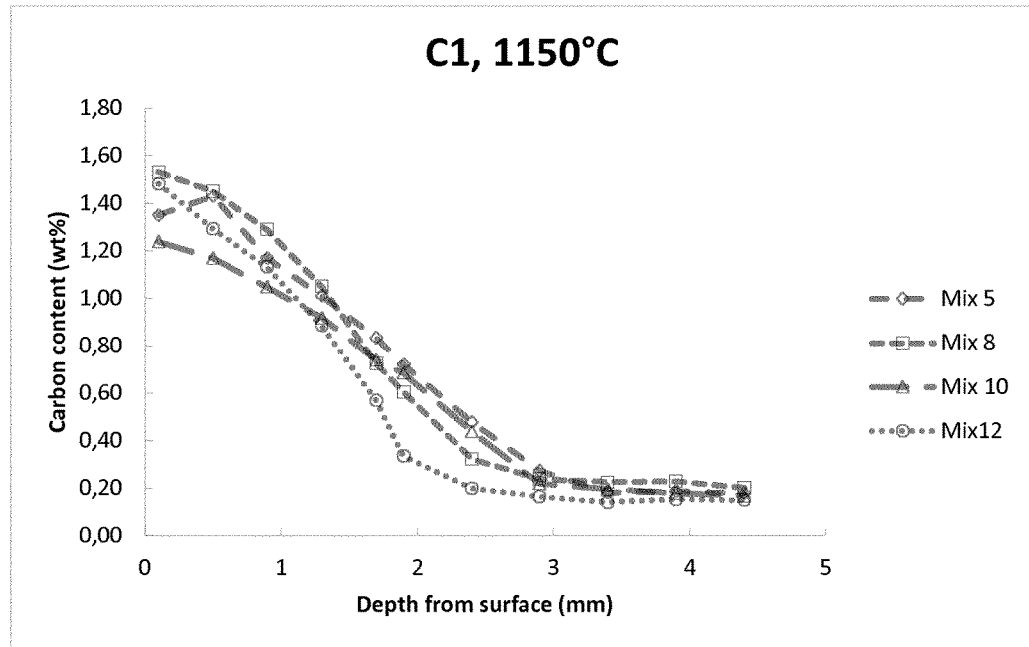
FIG. 4a shows carbon content as a function of distance from the surface for samples which were carburised at 980° C. and thereafter austenitised at 1150° C.
Figure 4B:
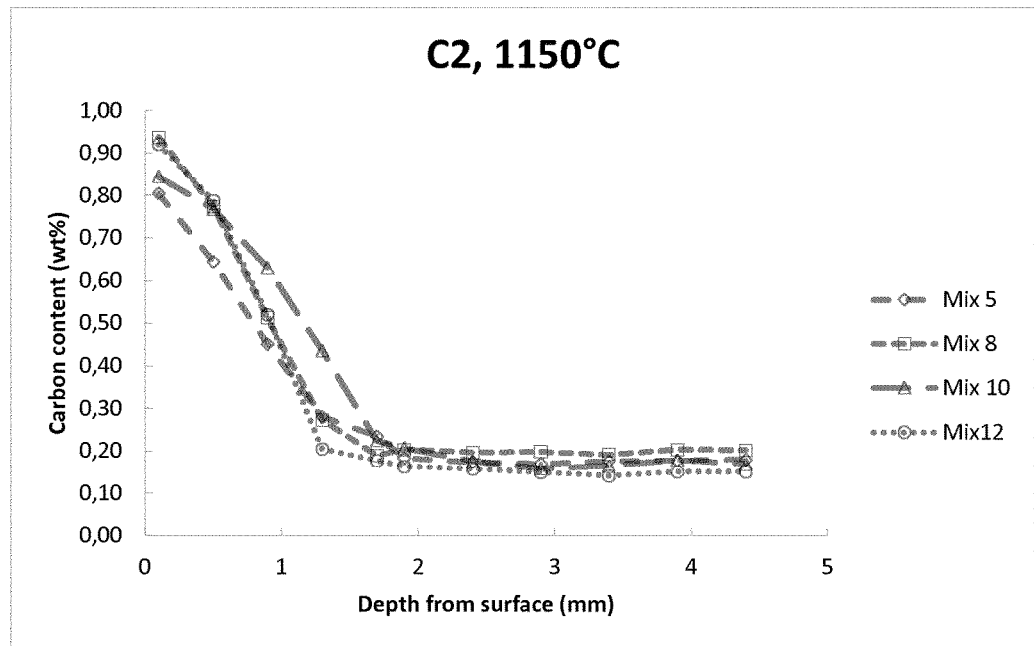
FIG. 4b shows carbon content as a function of distance from the surface for samples which were carburised at 955° C. and thereafter austenitised at 1150° C.

For the carburised and subsequently heat treated samples, hardness profiles were obtained using Vicker's hardness test with a 0.5 kg load. Hardness profiles for samples which were heat treated according to HT1 (1050° C., samples Mix5-1b, Mix5-1c, Mix8-1b, Mix8-1c, Mix10-1b, Mix10-1c, Mix12-1b, Mix12-1c) are shown in FIG. 1a (carburising cycle C1) and b (carburising cycle C2) and hardness profiles for samples which were heat treated according to HT3 (1150° C., samples Mix5-3b, Mix5-3c, Mix8-3b, Mix8-3c, Mix10-3b, Mix10-3c, Mix12-3b, Mix12-3c) are shown in FIG. 2a (carburising cycle C1) and b (carburising cycle C2). In the figures, the hardness of the samples is plotted as a function of the distance from the surface. It is clear from the figures that the samples hardened at the higher temperature exhibit increased hardness compared to the samples hardened at the lower temperature. FIGS. 3a and b and FIGS. 4a and b show carbon content as a function of distance from the surface for samples heat treated according to HT1 (1050° C., samples Mix5-1b, Mix5-1c, Mix8-1b, Mix8-1c, Mix10-1b, Mix10-1c, Mix12-1b, Mix12-1c) and according to HT3 (1150° C., samples Mix5-3b, Mix5-3c, Mix8-3b, Mix8-3c, Mix10-3b, Mix10-3c, Mix12-3b, Mix12-3c), respectively. As can be seen from the figures, carburising at 980° C. (C1) gives significantly higher levels of carbon than carburising at 955° C. (C2), and correspondingly higher hardness.

The carburised samples based on Mix2 (not shown graphically) has a surface hardness of approximately 720 HV, which at 1.5 mm depth from the surface has decreased to 620 HV. The core hardness of the carburised samples based on Mix2 is 360 HV. It can be assumed that hardening at 1150° C., using a process according to HT3, would increase the hardness of the material. Results from the non-carburised samples indicate that the hardness of the core would probably not reach the same levels as the samples based on Mix5 and Mix8.

Figure 5:
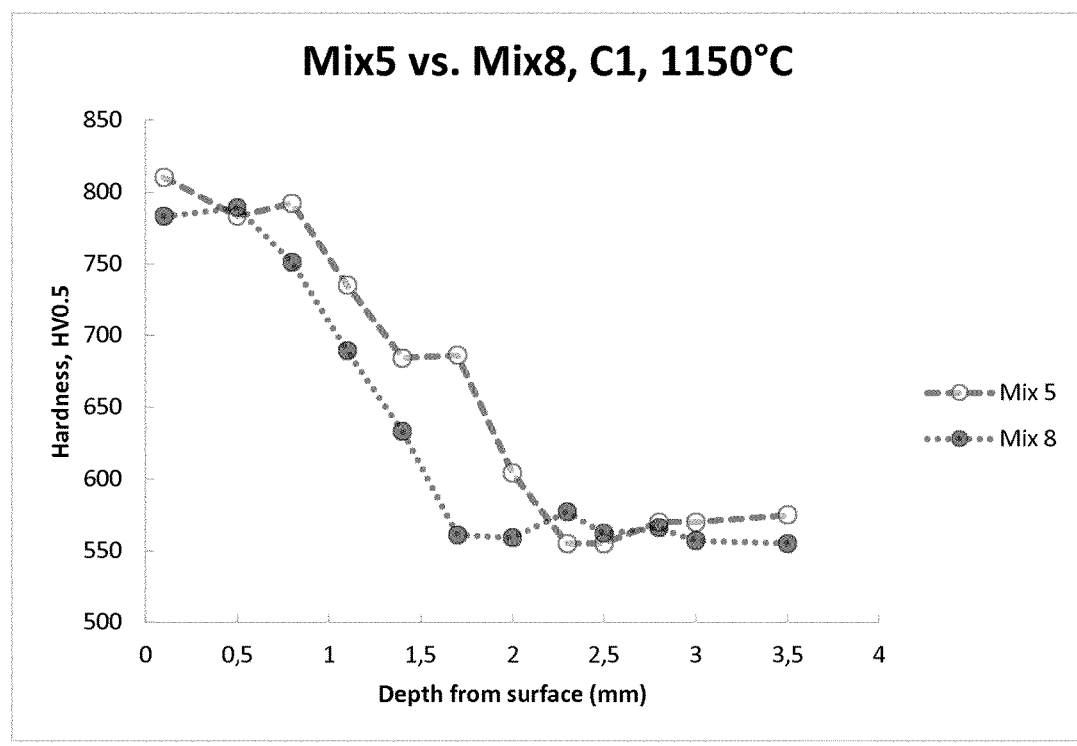
FIG. 5 shows hardness profiles obtained for two samples which were carburised at 980° C. and thereafter austenitised at 1150° C.

The best compromise in terms of surface and core hardness is obtained with the samples Mix5-3b and Mix8-3b, which both show a surface hardness around 800 HV and a core hardness around 550 HV. The hardness profiles of those two samples are compared in FIG. 5. As can be seen from the profiles, sample Mix5-3b exhibits a thicker surface layer with high hardness than sample Mix8-3b. More specifically, the hardness of approximately 800 HV is for Mix5-3b preserved down to a distance of approximately 0.8 mm from the surface, whereas for Mix8-3b, the hardness at a distance of approximately 0.8 mm from the surface has decreased to around 700 HV.

The microstructures of the samples Mix5-2, Mix8-2, Mix10-2 and Mix12-2 were compared. The volume fractions of delta ferrite found in the cores using light optical microscopy are shown in Table II. Mix5-2 has a tempered martensite core with fine carbides and is free from ferrite. Mix8-2 is duplex quenched, i.e. containing both tempered martensite and delta ferrite, with fine carbides. Mix10-2 is also duplex quenched but with a significantly larger fraction of delta ferrite. Also Mix12-2 is duplex quenched, with a fraction of delta ferrite larger than Mix5-2 and Mix8-2.

The samples Mix5-1b, Mix5-1c, Mix5-3b and Mix5-3c exhibit a core free from ferrite, as verified by X-ray diffraction carried out at temperatures between 1050° C. and 1150° C.

The samples based on steel alloy Mix12, falling outside the scope of the invention, exhibit an insufficient surface hardness after carburising. Moreover, these samples comprise a relatively large amount of delta ferrite in the core after tempering. The properties after hardening of a non-homogeneous core comprising ferrite are more difficult to predict and a homogeneous core is therefore preferable. The samples based on Mix10, also outside the scope of the invention, comprise a large fraction of delta ferrite in the core after tempering, and also a relatively soft core.

The non-carburised samples based on Mix2, i.e. Mix2-1a and Mix2-3a, also exhibit a core consisting of both martensite and ferrite as verified by X-ray diffraction. The relative fractions of the phases were however not determined.

The invention is not limited to the embodiments disclosed, but may be varied and modified within the scope of the following claims.

The invention claimed is:

1. A method of making carburisable steel alloy comprising, in percent by weight:
C 0.05-0.5 wt. %,
Cr 2.5-5.0 wt. %,
Mo 4-6 wt. %,
W 2-4.5 wt. %,
V 1-3 wt. %,
Ni 2-4 wt. %,
Co 2-8 wt. %,
optionally one or more of the following elements:
Nb 0-2 wt. %,
N 0-0.5 wt. %,
Si 0-0.7 wt. %,
Mn 0-0.7 wt. %,
Al 0-0.15 wt. %,
wherein the combined amount of Nb+V is within the range 1-3.5 wt. %, the combined amount of C+N is within the range 0.05-0.5 wt. %, and the balance being Fe and unavoidable impurities, comprising
producing the steel alloy by vacuum induced melting and vacuum arc remelting (VIM-VAR), or
forming the steel alloy as a powder metallurgy steel alloy by gas atomisation, and additionally comprising
hardening and tempering the steel alloy to have a microstructure comprising tempered martensite and precipitated carbides, which microstructure is free or essentially free from ferrite.

2. A method for making a mechanical component comprising a steel alloy comprising, in percent by weight:
C 0.05-0.5 wt. %,
Cr 2.5-5.0 wt. %,
Mo 4-6 wt. %,
W 2-4.5 wt. %,
V 1-3 wt. %,
Ni 2-4 wt. %,
Co 2-8 wt. %,
optionally one or more of the following elements:
Nb 0-2 wt. %,
N 0-0.5 wt. %,
Si 0-0.7 wt. %,
Mn 0-0.7 wt. %,
Al 0-0.15 wt. %,
wherein the combined amount of Nb+V is within the range 1-3.5 wt. %, the combined amount of C+N is within the range 0.05-0.5 wt. %, and the balance being Fe and unavoidable impurities, comprising
producing the steel alloy by vacuum induced melting and vacuum arc remelting (VIM-VAR), or
forming the steel alloy as a powder metallurgy steel alloy by gas atomisation, and additionally comprising
carburising and/or nitriding the mechanical component to have a surface layer with an increased hardness.

3. The method according to claim 2, comprising
forming the mechanical component from hot isostatically-pressed powder metallurgy steel alloy.

4. A method of making carburisable steel alloy comprising, in percent by weight:
C 0.05-0.5 wt. %,
Cr 2.5-5.0 wt. %,
Mo 4-6 wt. %,
W 2-4.5 wt. %,
V 1-3 wt. %,
Ni 2-4 wt. %,
Co 2-8 wt. %,
Si 0.05-0.7 wt. %,
Mn 0.05-0.7 wt. %,
optionally one or more of the following elements:
Nb 0-2 wt. %,
N 0-0.5 wt. %,
Al 0-0.15 wt. %,
wherein the combined amount of Nb+V is within the range 1-3.5 wt. %,
the combined amount of C+N is within the range 0.05-0.5 wt. %, and the balance being Fe and unavoidable impurities, comprising producing the steel alloy by vacuum induced melting and vacuum arc remelting (VIM-VAR), or forming the steel alloy as a powder metallurgy steel alloy by gas atomisation.

5. The method according to claim 4, wherein the steel alloy comprises less than 1 wt. % unavoidable impurities.

6. The method according to claim 5, wherein the steel alloy comprises less than 0.5 wt. % unavoidable impurities.

7. The method according to claim 4, wherein the combined amount of C+N is within the range 0.05-0.3 wt. %.

8. The method according to claim 4, wherein the steel alloy comprises 0.1-0.3 wt. % C.

9. The method according to claim 4, wherein the steel alloy comprises 3-4.5 wt. % Cr.

10. The method according to claim 9, wherein the steel alloy comprises 3-4 wt. % Cr.

11. The method according to claim 4, wherein the steel alloy comprises 3-7 wt. % Co.

12. The method according to claim 11, wherein the steel alloy comprises 4-6 wt. % Co.

13. The method according to claim 4, wherein the steel alloy comprises 1.5-2.5 wt. % V.

14. The method according to claim 4, wherein the expression 11 wt. %$\leq W_{eq} \leq$15 wt. % is satisfied, wherein $W_{eq}$=W+2*Mo.

15. A method for making a mechanical component comprising a steel alloy according to claim 4, comprising carburising and/or nitriding the mechanical component to have a surface layer with an increased hardness.

16. The method according to claim 15, wherein the mechanical component is a bearing component.

17. The method according to claim 15, comprising carburising the mechanical component to have an increased carbon content in its surface layer.

18. The method according to claim 17, wherein the carbon content in the surface layer is at least 1.0 wt. %.

19. The method according to claim 18, wherein the carbon content in the surface layer is at least 1.1 wt. %.

* * * * *